US012610894B2

(12) United States Patent
Nieme et al.

(10) Patent No.: US 12,610,894 B2
(45) Date of Patent: Apr. 28, 2026

(54) SYSTEM COMPRISING A STRUCTURE FOR REMOVABLY ATTACHING ONE OR MORE HOLDERS FOR PLANTS, AND AT LEAST ONE HOLDER

(71) Applicant: Greenwall Solutions B.V., Uden (NL)

(72) Inventors: Johan Lambertus Bobbert Nieme, Uden (NL); Johannes Leopold Donald Molenaar, Uden (NL)

(73) Assignee: Greenwall Solutions B.V., Uden (NL)

( * ) Notice: Subject to any disclaimer, the term of this patent is extended or adjusted under 35 U.S.C. 154(b) by 0 days.

(21) Appl. No.: 18/695,865

(22) PCT Filed: Nov. 8, 2022

(86) PCT No.: PCT/NL2022/050628
§ 371 (c)(1),
(2) Date: Mar. 27, 2024

(87) PCT Pub. No.: WO2023/091003
PCT Pub. Date: May 25, 2023

(65) Prior Publication Data
US 2024/0389520 A1      Nov. 28, 2024

(30) Foreign Application Priority Data

Nov. 19, 2021     (NL) ...................................... 2029841

(51) Int. Cl.
*A01G 9/02* (2018.01)
(52) U.S. Cl.
CPC .................................... *A01G 9/023* (2013.01)

(58) Field of Classification Search
CPC .......... A01G 9/023; A01G 9/025; A01G 9/02; A01G 9/06; A01G 9/00; A47F 5/08;
(Continued)

(56) References Cited

U.S. PATENT DOCUMENTS

| | | | | |
|---|---|---|---|---|
| 3,031,088 A | * | 4/1962 | Ribbens | A47B 57/402 |
| | | | | 211/208 |
| 3,047,158 A | * | 7/1962 | Scholl | B42F 7/145 |
| | | | | 211/85.17 |

(Continued)

FOREIGN PATENT DOCUMENTS

| | | | |
|---|---|---|---|
| WO | 2006/133723 A1 | 12/2006 |
| WO | 2020/243672 A1 | 12/2020 |

*Primary Examiner* — Nkeisha Smith
(74) *Attorney, Agent, or Firm* — Ipsilon USA—NLO

(57) ABSTRACT

A system comprises a structure for removably attaching one or more holders for plants and the like, and at least one such holder. The structure comprises a plurality of horizontal supports; and a holder comprises a front part, a rear part connected to the front part and having a linear extension at a top side, and a bottom part for supporting the holder, located between the front and the rear parts. When the holder is attached to the structure, a first horizontal support is located between the front part and the linear extension and the centre of mass of the holder is at a distance in front of a plane formed by the plurality of horizontal supports, so that gravity pulling on the holder will make the linear extension engage with the first horizontal support of the structure and the bottom part engage with a second horizontal support.

14 Claims, 6 Drawing Sheets

(58) Field of Classification Search
    CPC ......... E04H 17/161; E04H 17/16; A47G 7/00;
                  A47G 7/02; A47G 7/041; A47G 7/04
    USPC ........................................................ 248/27.8
    See application file for complete search history.

(56)                 References Cited

U.S. PATENT DOCUMENTS

| | | | | |
|---|---|---|---|---|
| 3,698,565 | A * | 10/1972 | Weber | A47F 5/0846 |
| | | | | 211/126.15 |
| 3,726,411 | A * | 4/1973 | Jones | A47F 5/0025 |
| | | | | 220/532 |
| 4,228,906 | A * | 10/1980 | Jones | A47F 5/0025 |
| | | | | 248/222.13 |
| 4,896,456 | A * | 1/1990 | Grant | A01G 9/024 |
| | | | | 47/67 |
| 5,547,271 | A * | 8/1996 | Rydell | D06F 93/00 |
| | | | | 312/211 |
| 5,647,695 | A * | 7/1997 | Hilfiker | E02D 29/0208 |
| | | | | 405/258.1 |
| 6,471,080 | B1 * | 10/2002 | Hoffmann | A47B 63/00 |
| | | | | 211/126.5 |
| 7,856,756 | B1 * | 12/2010 | Caruso | A01G 9/023 |
| | | | | 211/182 |
| 8,061,539 | B2 * | 11/2011 | Punzel | A47B 47/021 |
| | | | | 248/220.21 |
| 8,250,804 | B2 * | 8/2012 | Chang | A01G 9/025 |
| | | | | 47/65.9 |
| 8,479,444 | B2 * | 7/2013 | Mesiara | A47G 7/044 |
| | | | | 248/27.8 |
| 9,271,452 | B2 * | 3/2016 | Sung | A01G 9/025 |
| 9,307,701 | B2 * | 4/2016 | Gosling | A01G 9/025 |
| 9,351,448 | B2 * | 5/2016 | Mackenzie | A01G 9/025 |
| 9,655,308 | B2 * | 5/2017 | MacKenzie | A01G 9/025 |
| 9,839,183 | B2 * | 12/2017 | Chang | A01G 9/025 |
| 10,517,229 | B2 * | 12/2019 | MacKenzie | A01G 9/025 |
| 11,140,835 | B2 * | 10/2021 | Gartland | A01G 27/003 |
| 11,633,051 | B2 * | 4/2023 | Gargano | A47F 5/0025 |
| | | | | 248/220.41 |
| 11,716,940 | B2 * | 8/2023 | Yukawa | A01G 9/0299 |
| | | | | 47/65 |
| 2007/0068073 | A1 * | 3/2007 | Holl | A01G 9/023 |
| | | | | 47/67 |
| 2007/0235397 | A1 * | 10/2007 | Wannop | A47B 88/60 |
| | | | | 211/81 |
| 2011/0154744 | A1 * | 6/2011 | Bowen | A01G 9/025 |
| | | | | 52/27 |
| 2011/0192081 | A1 * | 8/2011 | MacKenzie | A01G 9/025 |
| | | | | 47/65.5 |
| 2014/0075840 | A1 * | 3/2014 | Gosling | A01G 9/025 |
| | | | | 47/79 |
| 2015/0096949 | A1 * | 4/2015 | Chang | A01G 9/025 |
| | | | | 211/85.23 |
| 2015/0320243 | A1 * | 11/2015 | Bergerbest | F16M 13/022 |
| | | | | 248/214 |
| 2019/0150641 | A1 * | 5/2019 | Morin | A01G 9/025 |
| 2020/0296900 | A1 * | 9/2020 | Vettese | A01G 31/06 |
| 2022/0022383 | A1 * | 1/2022 | Li | A01G 9/023 |
| 2023/0329156 | A1 * | 10/2023 | Jung | A01G 9/025 |
| 2024/0206652 | A1 * | 6/2024 | Harlan | A01G 9/024 |

* cited by examiner

SYSTEM COMPRISING A STRUCTURE FOR REMOVABLY ATTACHING ONE OR MORE HOLDERS FOR PLANTS, AND AT LEAST ONE HOLDER

TECHNICAL FIELD

The disclosure relates to the provision of a system comprising a structure for removably attaching one or more holders for plants and the like, and at least one such holder.

BACKGROUND ART

Systems configured for accommodating holders for plants and the like may be used in agriculture to grow plants in a vertical arrangement, which may save space. Such systems may also be used for gardening. For example, plant pots may be attached to a fence. Attaching a plant pot to a fence may provide additional privacy and consumers may consider plants to look more pleasing than a fence.

WO2020243672A1 describes a vertical growing system that includes a frame assembly extending above a base surface, the frame assembly includes a support grid defining a longitudinal axis. The system further includes a propagation tray having a chamber for holding a plant therein and a mounting tray. The mounting tray is removably attached to the frame assembly and includes an interior surface sized to receive at least a portion of the propagation tray therein. The system further includes a positioning member sized to extend from the interior surface of the mounting tray to the propagation tray when the propagation tray is received within the mounting tray. The positioning member is shaped to orient the chamber at a first oblique angle relative to the longitudinal axis of the support grid.

The above information is presented as background information only to assist with an understanding of the disclosure. No determination has been made, and no assertion is made, as to whether any of the above might be applicable as prior art with regard to the disclosure.

SUMMARY OF THE INVENTION

Technical Problem

There remains a need for a convenient system that enables holders for plants and the like to be attached and detached to a structure. For example, if holders for plants can be conveniently attached and detached, it may be possible to move plants around on a structure, for example depending on aesthetic considerations or in order to regulate the amount of sunlight a particular plant receives.

Technical Solution

In a first aspect of this disclosure, a system comprising a structure for removably attaching one or more holders for plants and the like, and at least one such holder is provided. The structure comprises a plurality of horizontal supports, such as beams or wires and the at least one holder comprises a front part, a rear part connected to the front part and having a linear extension at the top side and a bottom part for supporting the holder, such as a groove, located between the front part and the rear part at a bottom of the holder, wherein, when the holder is attached to the structure, a first horizontal support among the plurality of horizontal supports of the structure is located between the front part and the linear extension and the centre of mass of the holder is at a distance in front of a plane formed by the plurality of horizontal supports, so that gravity pulling on the holder will make the linear extension engage with the first horizontal support of the structure and the bottom part engage with a second horizontal support among the plurality of horizontal supports of the structure.

A system according to the first aspect of the disclosure enables the holders to be attached and detached conveniently, because the entire holder may be simply and conveniently attached to or detached from the structure. When the holder is attached, gravity ensures that the holder is stably attached to the structure.

Some other advantages may include flexibility, because when there are multiple holders, these may be simply moved around. The plant holders are convenient to attach or detach. When the plant holders are attached to, for example, a balcony, such a system may improve privacy Advantageously, the front part and the rear part may form a container for plants. Containers are particularly suitable for holding plants. Many different shapes and forms of containers for plants are possible.

Advantageously, the front part may comprise a plane at a right angle with the rear part, forming a shelf. Shelves are suitable for holding plants or other objects.

Advantageously, the front part may comprise a plane at an angle between 10 and 90 degrees with the rear part, more preferably at an angle between 25 and 75 degrees, most preferably at an angle between 40 and 50 degrees. Such a configuration allows for a convenient way of holding plants between the front part and the rear part.

Advantageously, a height of the rear part matches a distance between horizontal supports, preferably a distance between adjacent horizontal supports. If the height of the rear part matches a distance between horizontal supports, the structure, or any part thereof, may be conveniently covered using a plurality of holders for plants. Additionally or alternatively, if the height of the rear part matches a distance between horizontal supports, a flexible and convenient configuration of holders is enabled.

Advantageously, the distance between adjacent horizontal supports may be 5-25 cm, preferably 10-20 cm, more preferably 13-17 cm, most preferably 14-16 cm. This may allow for a convenient size of holders for plants and the like.

Advantageously, the distance between adjacent horizontal supports may be 25-100 cm, preferably 30-75 cm, more preferably 40-60 cm, most preferably 45-55 cm. This may allow for a convenient size of holders for plants and the like.

Advantageously, the structure further comprises a plurality of vertical supports, such as beams or wires. Such a structure may be particularly strong, enabling the attachment of more or heavier holders for plants and the like.

Advantageously, a grid formed by the vertical and horizontal wires may be a square grid. This may allow for a convenient size of holders for plants and the like.

Advantageously, the distance between adjacent vertical supports may be 5-25 cm, preferably 10-20 cm, more preferably 13-17 cm, most preferably 14-16 cm. This may allow for a convenient size of holders for plants and the like.

Advantageously, the distance between adjacent vertical supports may be 25-100 cm, preferably 30-75 cm, more preferably 40-60 cm, most preferably 45-55 cm. This may allow for a convenient size of holders for plants and the like.

Advantageously, a width of the rear part matches a distance between vertical supports, preferably a distance between adjacent vertical supports. If the width of the rear part matches a distance between vertical supports, the structure, or any part thereof, may be conveniently covered using a plurality of holders for plants. Additionally or alternatively, if the width of the rear part matches a distance between vertical supports, a flexible and convenient configuration of holders is enabled.

Advantageously, the vertical and/or horizontal supports may be wires that may have a diameter of 0.3-2 cm, preferably 0.5-1.5 cm, more preferably 0.8-1.2 cm, most preferably 0.9-1.1 cm. These diameters may enable a convenient size of the linear extension and/or the bottom part, which may be a groove.

Advantageously, the vertical and horizontal supports may comprise steel wires. Steel is a suitable material for strong wires to which the holders may be attached.

Advantageously, the rear part may further comprise a vertical recess, wherein a first vertical support of the structure is accommodated in the vertical recess, optionally wherein the width of the rear part matches a multitude of a vertical grid spacing. Such a vertical recess enables plant holders that are wider than the distance between the vertical supports, which may also the possibility of combining plant holders of different sizes. If the width of the rear part matches a multitude of the vertical grid spacing, the structure, or any part thereof, may be conveniently covered using a plurality of holders for plants. Additionally or alternatively, if the width of the rear part matches a multitude of the vertical grid spacing, a flexible and convenient configuration of holders is enabled.

Advantageously, the rear part may further comprise a horizontal recess, wherein a third horizontal support of the structure is accommodated in the horizontal recess, optionally wherein the height of the rear part matches a multitude of a horizontal grid spacing. Such a horizontal recess enables plant holders that are wider than the distance between the horizontal supports, which may also the possibility of combining plant holders of different sizes. If the height of the rear part matches a multitude of the horizontal grid spacing, the structure, or any part thereof, may be conveniently covered using a plurality of holders for plants. Additionally or alternatively, if the width of the rear part matches a multitude of the horizontal grid spacing, a flexible and convenient configuration of holders is enabled.

Advantageously, the plant holders may be coupled to an irrigation system. For example, if multiple plant holders are arranged above each other, irrigation may be conveniently provided by providing the front part of each plant holder with a hole for letting water flow downwards.

BRIEF DESCRIPTION OF DRAWINGS

Embodiments of the present invention will be described hereinafter, by way of example only, with reference to the accompanying drawings which are schematic in nature and therefore not necessarily drawn to scale. Furthermore, like reference signs in the drawings relate to like elements. In the attached figures, FIG. 1 schematically shows a side view of a system according to an embodiment of the disclosure.

DETAILED DESCRIPTION

Figure 2:
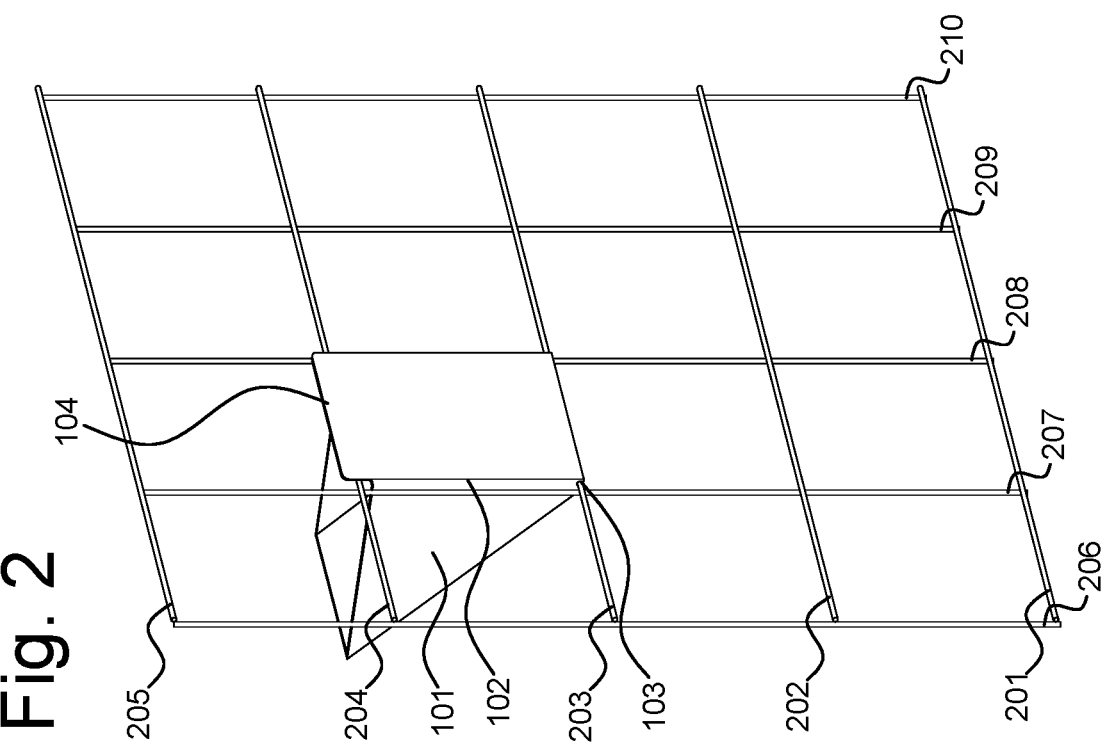
FIG. 2 schematically shows a back view of a system according to an embodiment of the disclosure.
Figure 1:
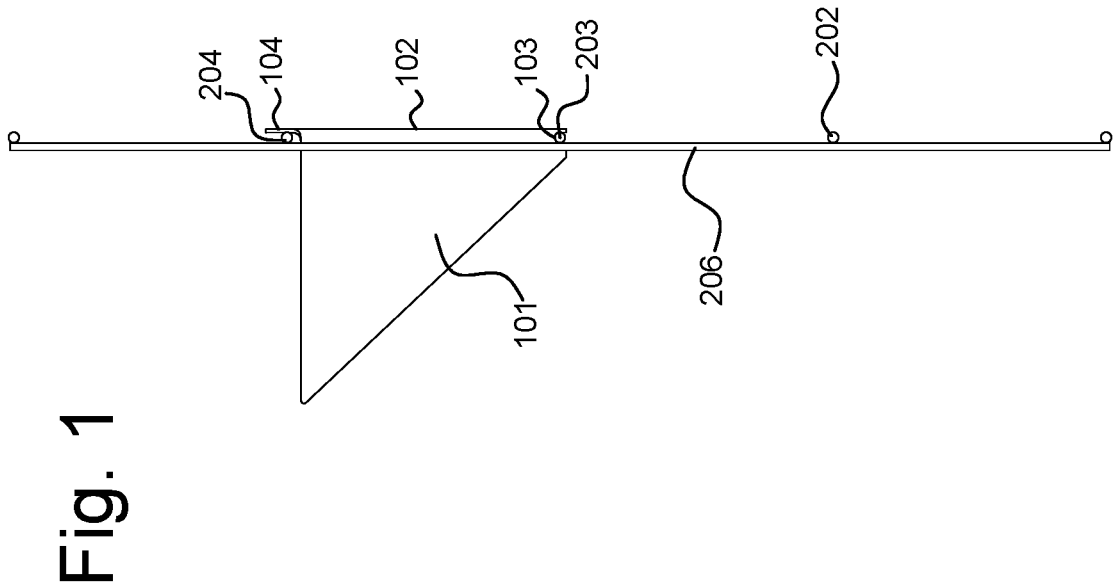
Figure 3:
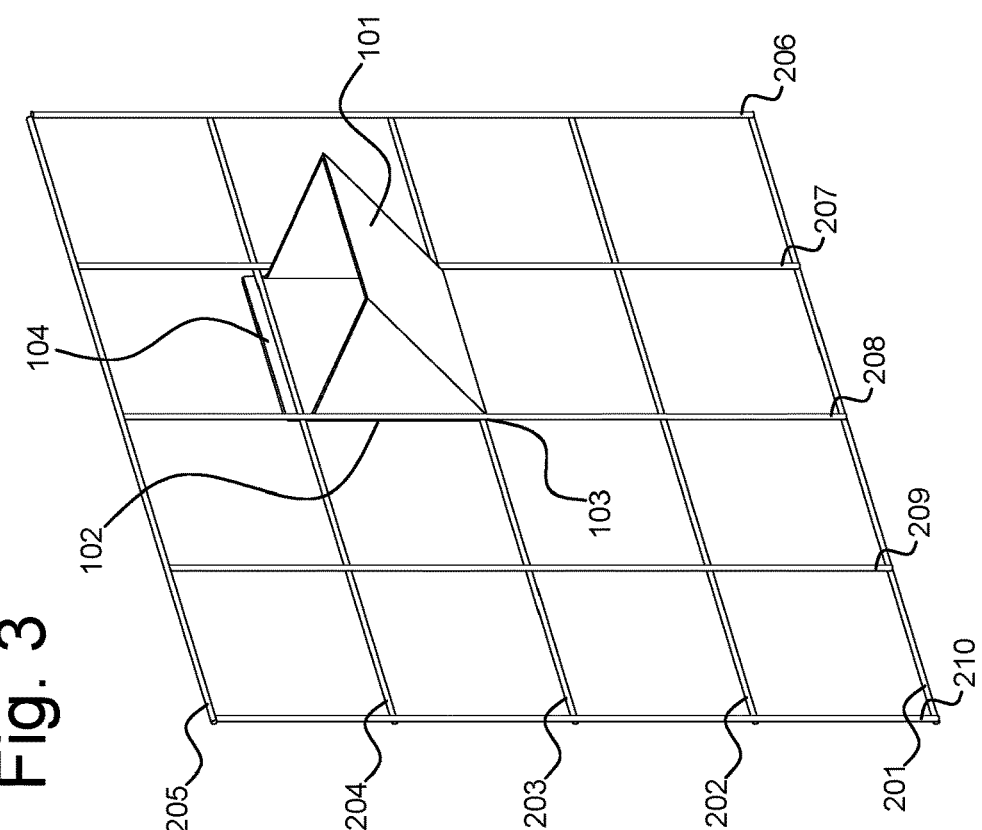
FIG. 3 schematically shows a front view of a system according to an embodiment of the disclosure.

FIGS. 1-3 schematically show a side view, a back view and a front view of a system according to an embodiment of the disclosure, respectively.

In FIG. 1, a side view of a system comprising a structure for removably attaching one or more holders for plants and the like, and at least one such holder is schematically shown. FIG. 2 schematically shows a back view of such a system and FIG. 3 schematically shows a front view of such a system.

The structure comprises a plurality of horizontal wires 201, 202, 203, 204, 205 and vertical wires 206, 207, 208, 209, 210 forming a grid and the at least one detachable holder comprises a front part 101, a rear part 102 connected to the front part 101 and having a linear extension 104 at the top side and a groove 103 located between the front part 101 and the rear part 102 at a bottom of the holder.

FIGS. 1-3 schematically show the situation wherein the holder is attached to the structure. When the holder is attached to the structure, a first horizontal wire 204 is located between the front part 101 and the linear extension 104 and the centre of mass of the holder is at a distance in front of the plane formed by the plurality of horizontal and vertical wires 201-210, so that gravity pulling on the holder will make the linear extension 104 engage with the first horizontal wire 204 of the structure and the groove 103 engage with a second horizontal wire 203 of the structure.

For example, the wires may be steel wires. For example, the vertical and horizontal wires may have a diameter of 0.3-2 cm, preferably 0.5-1.5 cm, more preferably 0.8-1.2 cm, most preferably 0.9-1.1 cm. For example, the distance between adjacent horizontal wires may be 5-25 cm, preferably 10-20 cm, more preferably 13-17 cm, most preferably 14-16 cm and/or the distance between adjacent vertical wires (206-210) may be 5-25 cm, preferably 10-20 cm, more preferably 13-17 cm, most preferably 14-16 cm. In another example, the distance between adjacent horizontal wires may be 25-100 cm, preferably 30-75 cm, more preferably 40-60 cm, most preferably 45-55 cm and/or the distance between adjacent vertical wires (206-210) may be 25-100 cm, preferably 30-75 cm, more preferably 40-60 cm, most preferably 45-55 cm.

In the example schematically shown in FIGS. 1-3, the structure comprises a plurality of horizontal wires 201, 202, 203, 204, 205 and vertical wires 206, 207, 208, 209, 210 forming a grid. However, different structures are also possible. For example, instead of or in addition to wires, other kinds of supports, such as, for example, beams may be used. Furthermore, as also shown below in FIG. 9, the vertical wires 206-210 are optional. It is also noted that even if vertical wires 206-210 are used, the horizontal wires 201-205 and vertical wires 206-210 need not necessarily form a grid.

In the example schematically shown in FIGS. 1-3, the holder comprises a groove 103. However, the skilled person will appreciate that such a groove 103 is not necessary and that this groove 103 may be replaced with any alternative bottom part suitable for supporting the holder.

In the example schematically shown in FIGS. 1-3, the front part 101 and the rear part 102 form a container suitable for plants. In this example, the front part comprises a plane at an angle of approximately 45 degrees with the rear part to form a container. However, different configurations of the front part or rear part are possible. Although a particular shape of container is shown, many different shapes and forms of containers for plants are possible.

In the example schematically shown in FIGS. 1-3, the grid formed by the vertical and horizontal wires 201-210 is a square grid. The size of the rear part 102 matches the size of the lattice spacing. In this way, the plant holders have a square shape. It is possible to place a holder into as many locations as desired. When seen from the front, the holder covers practically the whole grid cell formed by the spacing between adjacent wires 203, 204, 207, 208. In this way, it may be possible to completely cover the structure with plant holders, which consumers may consider to look pleasing.

It is noted that it is possible to place a holder into any grid cell, and also to move the holders around if desired. For example, if two different holders comprise two different plants, the appearance of the structure may be changed by interchanging the positions of the holders.

It is further noted that it is possible to mix-and-match different kinds of holders. For example, the holders may differ in colour and/or in the shape of the front part 101. Although FIGS. 1-3 schematically show a front part 101 with a particular shape, the skilled person is aware that many different shapes are possible.

Advantageously, it may be possible to provide one or more holes (not shown) into a bottom part of the front part 101. Such holes may be used for drainage. Furthermore, if a plurality of holders is arranged one above another, water coming out of a holder located at a higher position may drop into a holder located into a lower position, enabling plants in the plurality of holders to be watered conveniently.

Figure 4:
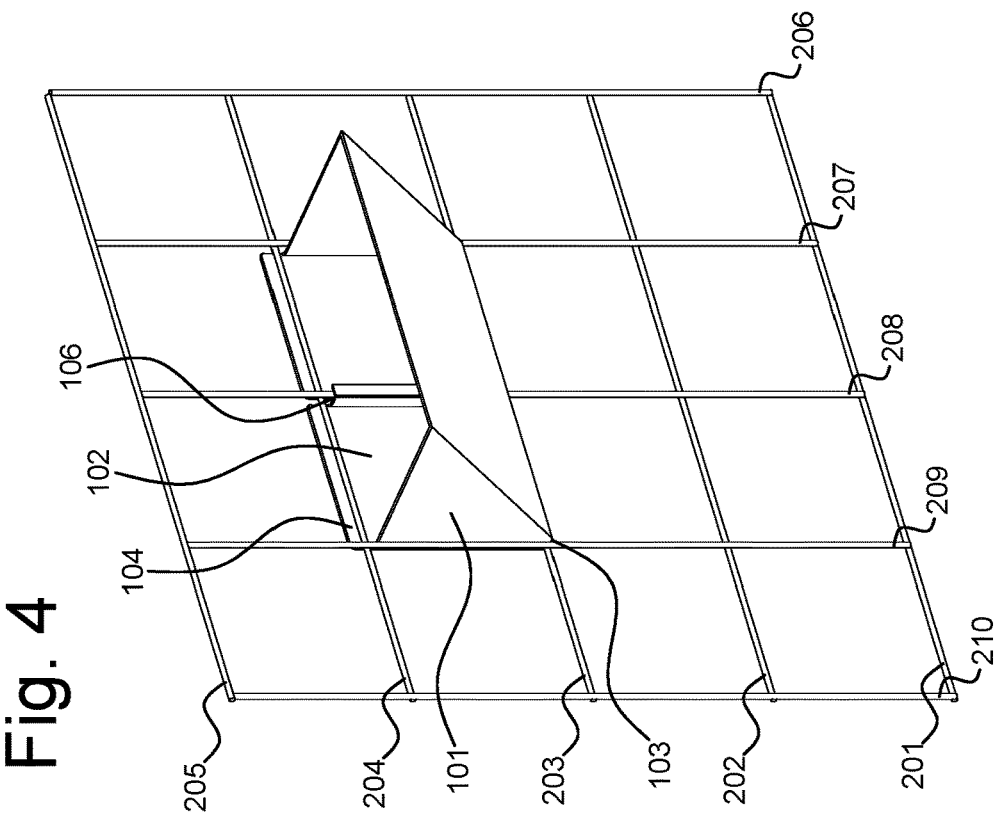
FIG. 4 schematically shows a front view of a system according to an embodiment of the disclosure.

FIG. 4 schematically shows a front view of a system according to an embodiment of the disclosure.

Many features shown in FIG. 4 are similar to those shown in FIGS. 1-3, and a description thereof will be omitted.

The rear part 102 schematically shown in FIG. 4 comprises a vertical recess 106, wherein a first vertical wire 208 of the structure is accommodated in the vertical recess 106. The width of the rear part 102 matches a multitude of the vertical grid spacing. Namely, the width of the rear part 102 matches twice the vertical grid spacing. Of course, plant holders for which the width of the rear part 102 matches three or more times the vertical grid spacing are also possible.

Because of the vertical recess, the plant holder that is schematically shown in FIG. 4 may be conveniently attached and detached from the structure, even though the rear part 102 is wider than the vertical grid spacing. When the plant holder is attached to the structure, gravity ensures that the holder is stably attached to the structure. Namely, because the centre of mass of the holder is at a distance in front of the plane formed by the plurality of horizontal and vertical wires, gravity pulling on the holder will make the linear extension 104 engage with a first horizontal wire 204 of the structure and the groove engage 103 with a second horizontal wire 203 of the structure. This prevents the holder from falling down.

It is noted that a plant holder as schematically shown in FIG. 4 may be combined with a plant holder as schematically shown in FIGS. 1-3. Multiple plant holders of different sizes may be attached to a structure. This enables a great variety of plants to be put into the plant holders of the system.

Figure 6:
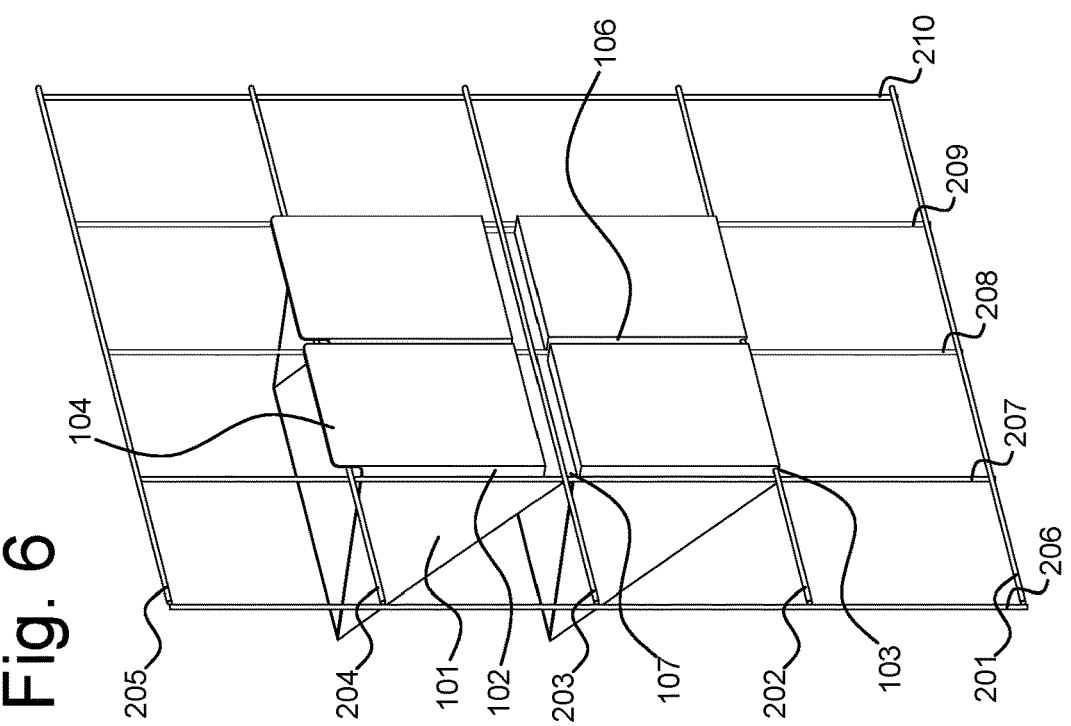
FIG. 6 schematically shows a rear view of a system according to an embodiment of the disclosure.
Figure 5:
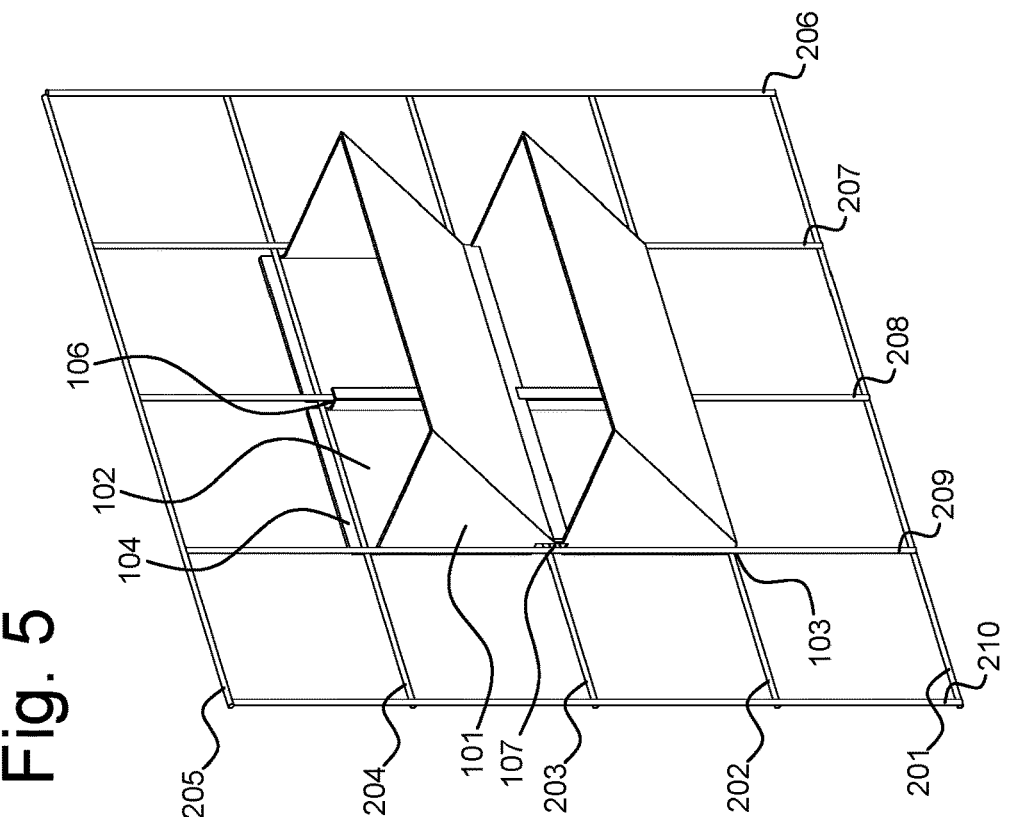
FIG. 5 schematically shows a front view of a system according to an embodiment of the disclosure.

FIGS. 5-6 schematically show a front view and a back view of a system according to an embodiment of the disclosure, respectively.

Many features shown in FIGS. 5-6 are similar to those shown in FIGS. 1-4, and a description thereof will be omitted.

The rear part 102 schematically shown in FIGS. 5 and 6 comprises a vertical recess 106, wherein a first vertical wire 208 of the structure is accommodated in the vertical recess 106. The width of the rear part 102 matches a multitude of the vertical grid spacing. Namely, the width of the rear part 102 matches twice the vertical grid spacing. Of course, plant holders for which the width of the rear part 102 matches three or more times the vertical grid spacing are also possible.

Furthermore, the rear part 102 schematically shown in FIGS. 5 and 6 comprises a horizontal recess 107, wherein a third horizontal wire 203 of the structure is accommodated in the horizontal recess 107. In FIGS. 5 and 6, the linear extension 104 engages with a first horizontal wire 204 of the structure and the groove 103 engages with a second horizontal wire 202 of the structure. The height of the rear part 102 matches a multitude of the horizontal grid spacing. Namely, the height of the rear part 102 matches twice the horizontal grid spacing. Of course, plant holders for which the height of the rear part 102 matches three or more times the horizontal grid spacing are also possible.

In FIGS. 5 and 6, the front part 101 and the rear part 102 form two containers for plants. In particular, the front part 101 and the rear part 102 form an upper and a lower container for plants. However, different shapes are also possible. For example, the front part 101 and the rear part 102 may also form a left and a right container for plants. Instead of forming two containers for plants, the front part 101 and the rear part 102 may also form a different number of containers for plants, such as one, three, four or more containers. Furthermore, even though FIGS. 5 and 6 show an example in which the upper container and the lower container look similar, it is also possible to form containers that look different from each other. In case that there are three or more containers, it is possible that some containers look similar to each other, while other containers look different from each other.

Figure 8:
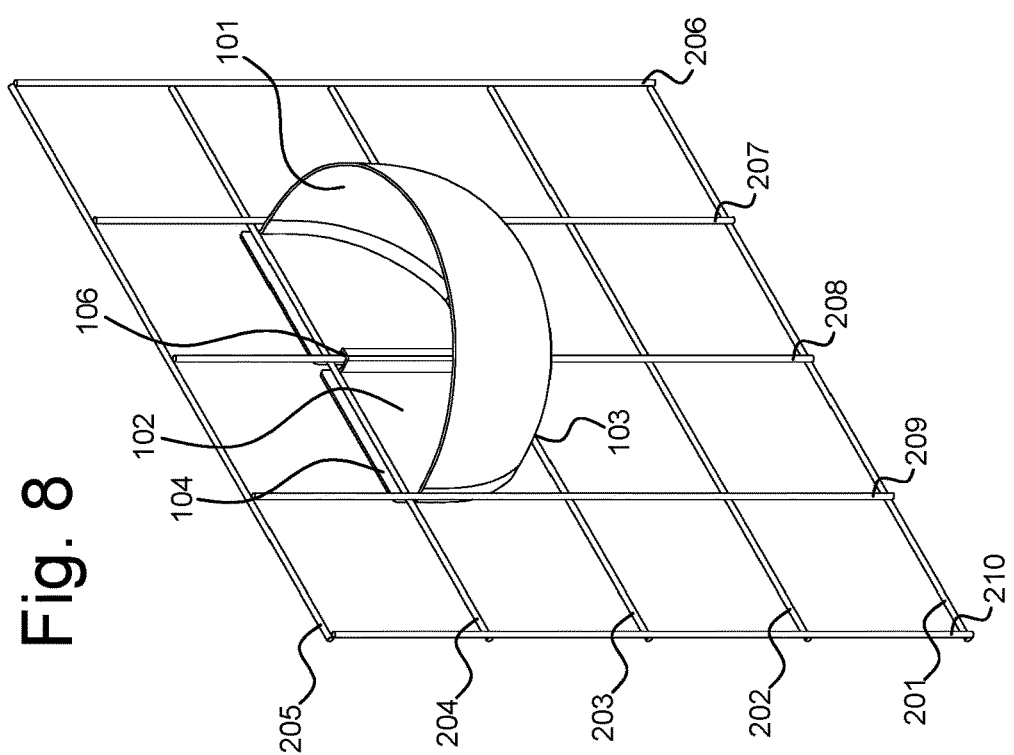
FIG. 8 schematically shows a front view of a system according to an embodiment of the disclosure.
Figure 7:
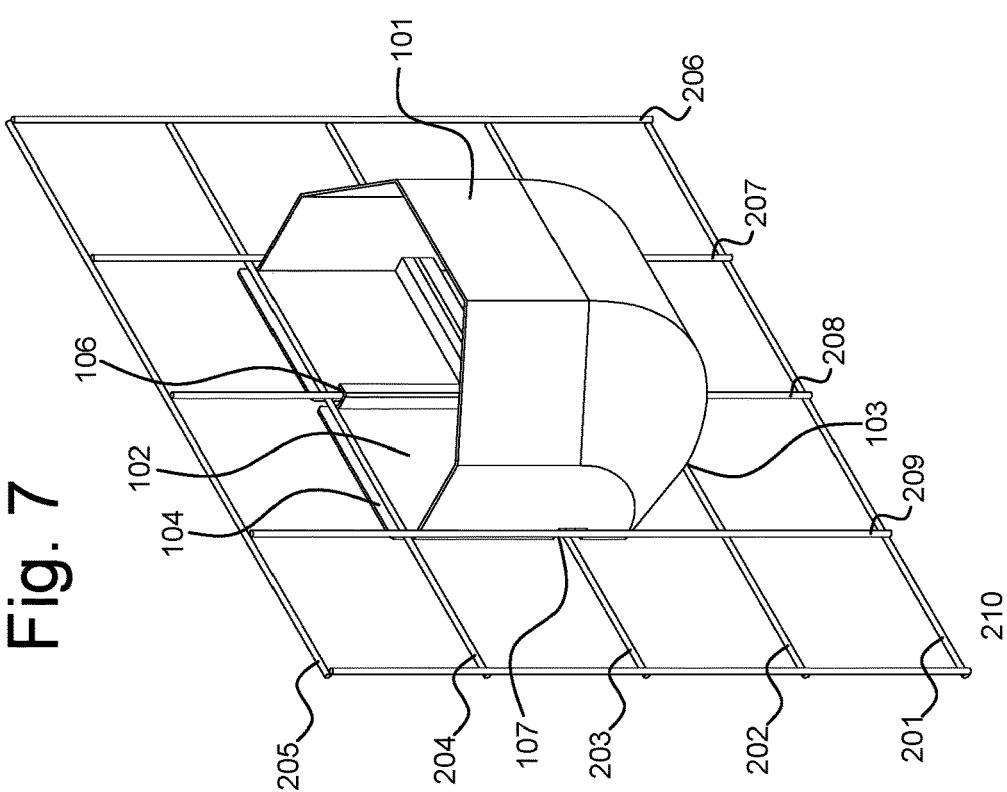
FIG. 7 schematically shows a front view of a system according to an embodiment of the disclosure.

FIGS. 7-8 schematically show front views of systems according to an embodiment of the disclosure, respectively.

Many features shown in FIGS. 7-8 are similar to those shown in FIGS. 1-6, and a description thereof will be omitted.

As can be seen from FIGS. 7-8, many different shapes of the front part 101 are possible. Through the various shapes, plant containers with different looks may be provided. The holders shown in the various Figures may be combined with each other to obtain systems with different looks. Because the attachment means using the linear extension 104 and the groove 103 are the same for holders with different front parts 101, these holders can be mixed-and-matched by attaching the holders to the structure as desired.

Figure 9:
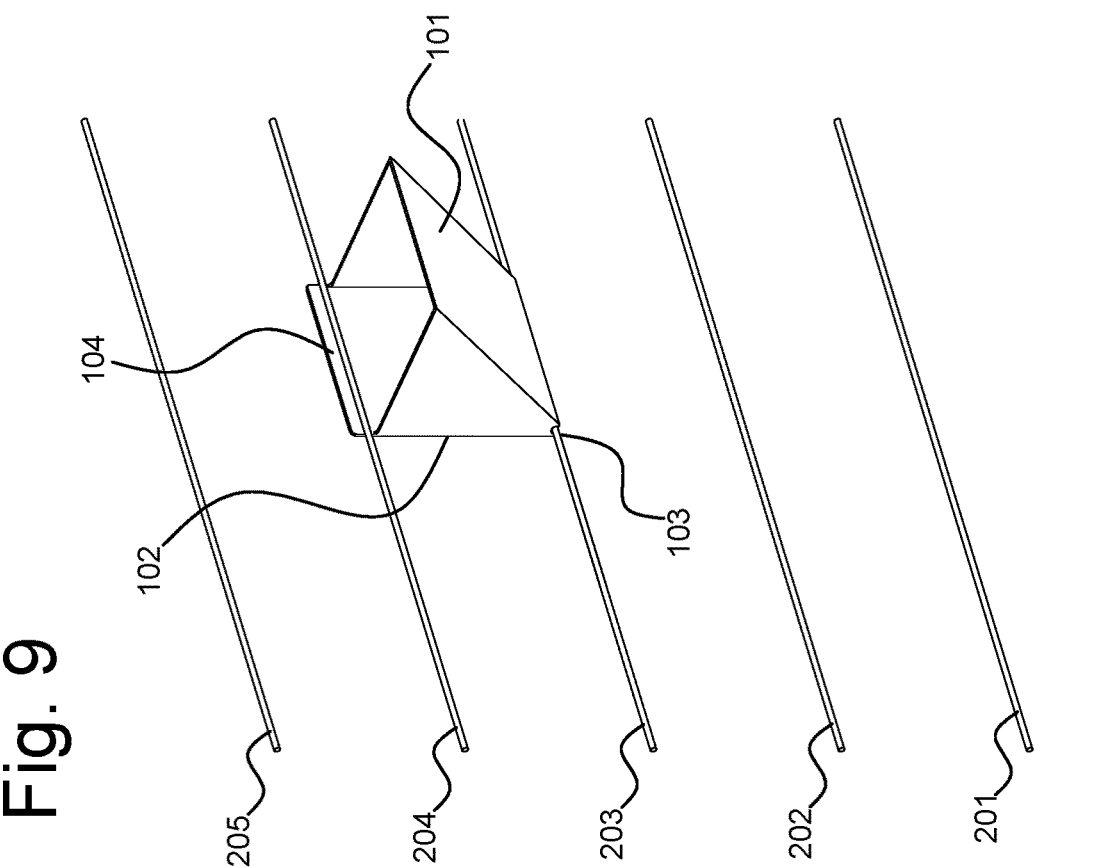
FIG. 9 schematically shows a front view of a system according to an embodiment of the disclosure.

FIG. 9 schematically shows a front view of a system according to an embodiment of the disclosure.

Many features shown in FIG. 9 are similar to those shown in FIGS. 1-8, and a description thereof will be omitted.

It can be seen in FIG. 9 that the structure need not comprise vertical supports 206-210. It is sufficient if a structure only comprises horizontal supports 201-205, such as beams or wires. The skilled person will appreciate that the horizontal supports 201-205 are sufficiently stiff to enable a holder to be attached. Although the Figures depict 5 horizontal supports, any number of horizontal supports may be used, as long as there is at least one with which the linear extension 104 may engage and another one with which the bottom part 103 may engage.

Figure 10:
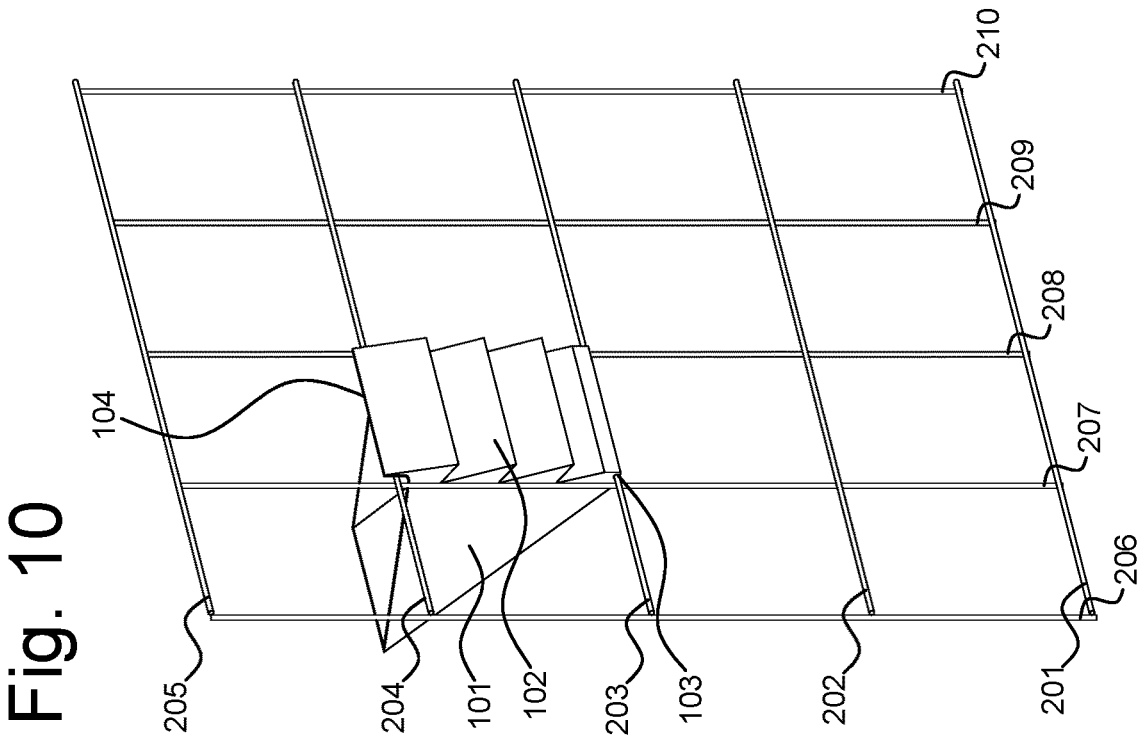
FIG. 10 schematically shows a rear view of a system according to an embodiment of the disclosure.
Figure 11:
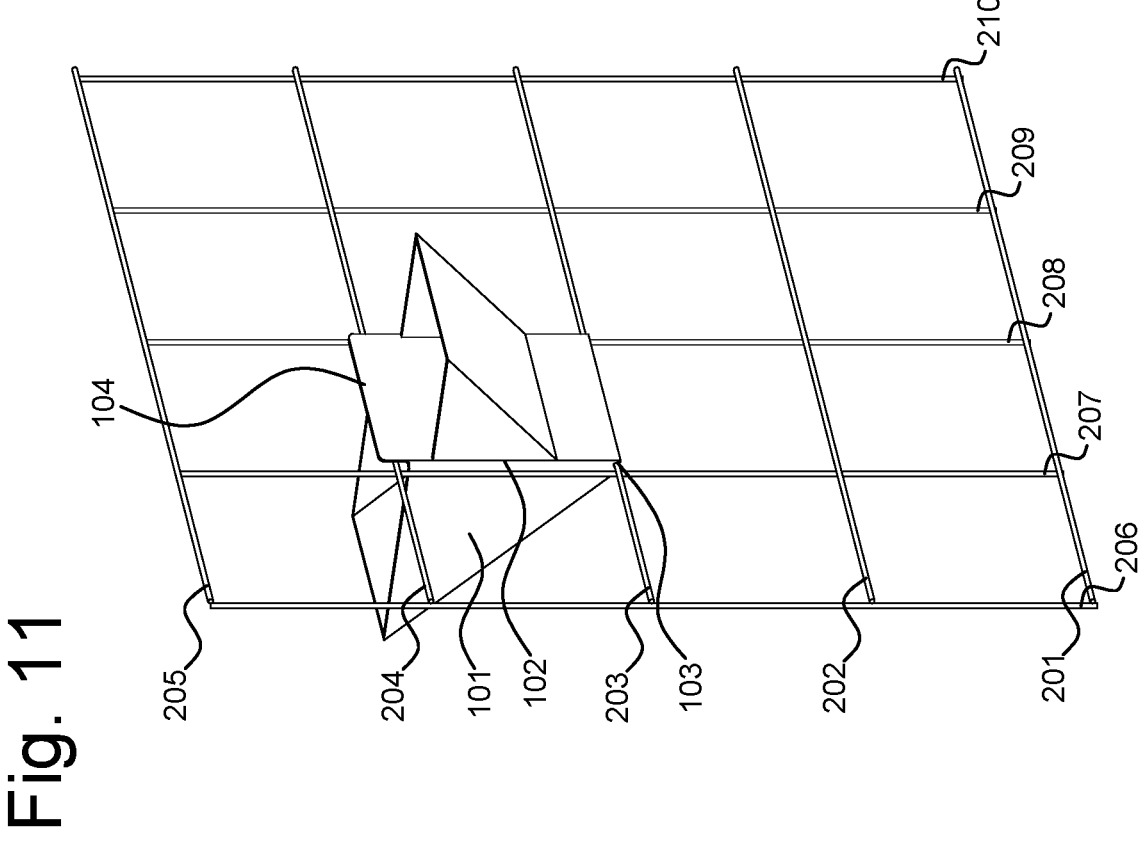
FIG. 11 schematically shows a rear view of a system according to an embodiment of the disclosure.

FIGS. 10-11 schematically show front views of systems according to an embodiment of the disclosure, respectively.

Many features shown in FIGS. 10-11 are similar to those shown in FIGS. 1-9, and a description thereof will be omitted.

As can be seen from FIGS. 10-11, many different shapes of the rear part 102 are possible. For example, FIGS. 1-9 show a flat rear part 102. For example, FIG. 10 shows a rear part 102 comprising ridges. For another example, FIG. 11 shows a rear part 102 comprising a small plant holder. As yet another example, a rear part 102 may be curved, or comprise a combination of shapes. As the skilled person will appreciate, an important consideration in the shape of the front part 101 and/or the rear part 102 is that the centre of mass of the holder should be in front of a plane formed by the plurality of horizontal supports 201-205.

In the foregoing description of the figures, the invention has been described with reference to specific embodiments thereof. It will, however, be evident that various modifications and changes may be made thereto without departing from the scope of the invention as summarized in the appended claims.

In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

In particular, combinations of specific features of various aspects of the invention may be made. An aspect of the invention may be further advantageously enhanced by adding a feature that was described in relation to another aspect of the invention.

It is to be understood that the invention is limited by the appended claims only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

Aspects of the invention can also be understood from the following clauses:

Clause 1. A system comprising a structure for removably attaching one or more holders for plants and the like, and at least one such holder, the structure comprising a plurality of horizontal supports, such as beams or wires, (201-205); and the at least one detachable holder comprising: a front part (101), a rear part (102) connected to the front part (101) and having an extension (104) at a top side, and a bottom part (103) for supporting the holder, such as a groove, located between the front part (101) and the rear part (102), wherein, when the holder is attached to the structure, a first horizontal support among the plurality of horizontal supports (201-205) of the structure is located between the front part (101) and the extension (104) and the centre of mass of the holder is at a distance in front of the plane formed by the plurality of horizontal supports (201-205), so that gravity pulling on the holder will make the extension (104) engage with the first horizontal support and the bottom part (103) engage with a second horizontal support among the plurality of horizontal supports (201-205) of the structure.

Clause 2. The system of clause 1, wherein the front part (101) and the rear part (102) form a container for plants.

Clause 3. The system of clause 1 or 2, wherein the front part (101) comprises a plane at a right angle with the rear part (102), forming a shelf.

Clause 4. The system of clause 1 or 2, wherein the front part (101) comprises a plane at an angle between 10 and 90 degrees with the rear part (102), more preferably at an angle between 25 and 75 degrees, most preferably at an angle between 40 and 50 degrees.

Clause 5. The system of any one of the previous clauses, wherein a height of the rear part (102) matches a distance between horizontal supports, preferably a distance between adjacent horizontal supports.

Clause 6. The system of any one of the previous clauses, wherein the rear part (102) further comprises a horizontal recess, wherein a third horizontal support of the structure is accommodated in the horizontal recess.

Clause 7. The system of any one of the previous clauses, wherein a distance between adjacent horizontal supports (201-205) is 5-25 cm, preferably 10-20 cm, more preferably 13-17 cm, most preferably 14-16 cm.

Clause 8. The system of any one of clauses 1-6, wherein a distance between adjacent horizontal supports (201-205) is 25-100 cm, preferably 30-75 cm, more preferably 40-60 cm, most preferably 45-55 cm.

Clause 9. The system of any of the previous clauses, wherein the structure further comprises a plurality of vertical supports (206-210), such as beams or wires.

Clause 10. The system of clause 9, wherein a grid formed by the vertical and horizontal wires (201-210) is a square grid.

Clause 11. The system of clause 9, wherein the distance between adjacent vertical supports (206-210) is 5-25 cm, preferably 10-20 cm, more preferably 13-17 cm, most preferably 14-16 cm.

Clause 12. The system of clause 9, wherein a distance between adjacent vertical supports (201-205) is 25-100 cm, preferably 30-75 cm, more preferably 40-60 cm, most preferably 45-55 cm.

Clause 13. The system of any one of clauses 9-12, wherein a width of the rear part (102) matches a distance between vertical supports, preferably a distance between adjacent vertical supports.

Clause 14. The system of any one of clauses 9-13, wherein the rear part (102) further comprises a vertical recess (106), wherein a first vertical support (208) of the structure is accommodated in the vertical recess (106).

The invention claimed is:

1. A system comprising a structure for removably attaching one or more detachable holders for plants:

the structure comprising a plurality of horizontal supports; and the one or more detachable holders for plants comprising:
a front part, a rear part connected to the front part and having a linear extension at a top side, wherein the linear extension is configured to engage with a first horizontal support, and a bottom part for supporting the one or more detachable holders for plants located between the front part and the rear part, wherein the bottom part includes a mechanism to engage the one or more detachable holders to a second horizontal support of the plurality of horizontal supports, wherein the first horizontal support and the second horizontal support are parallel to each other, wherein when the one or more detachable holders for plants is attached to the structure, a centre of mass of the one or more detachable holders for plants is at a distance in front of a plane formed by the first horizontal support and the second horizontal support, so that gravity pulling on the one or more detachable holders for plants will make the linear extension engage with the first horizontal support and the bottom part engage with the second horizontal support.

2. The system of claim 1, wherein the front part and the rear part form a container for plants.

3. The system of claim 1, wherein the front part comprises a plane at a right angle with the rear part, forming a shelf.

4. The system of claim 1, wherein the front part comprises a plane at an angle between 10 and 90 degrees with the rear part.

5. The system of claim 1, wherein a distance between a bottom of the rear part and a top of the rear part matches a distance between the first horizontal support and the second horizontal support.

6. The system of claim 1, wherein the rear part further comprises a horizontal recess, wherein a third horizontal support of the structure is accommodated in the horizontal recess.

7. The system of claim 1, wherein a distance between adjacent horizontal supports is 5-25 cm.

8. The system of claim 1, wherein a distance between adjacent horizontal supports is 25-100 cm.

9. The system of claim 1, wherein the structure further comprises a plurality of vertical supports, such as beams or wires.

10. The system of claim 9, wherein a grid formed by vertical and horizontal wires is a square grid.

11. The system of claim 9, wherein a distance between adjacent vertical supports is 5-25 cm.

12. The system of claim 9, wherein a distance between adjacent vertical supports is 25-100 cm.

13. The system of claim 9, wherein a width of the rear part matches a distance between vertical supports, preferably a distance between adjacent vertical supports.

14. The system of claim 9, wherein the rear part further comprises a vertical recess, wherein a first vertical support of the structure is accommodated in the vertical recess.

* * * * *